United States Patent
Lin

(10) Patent No.: US 9,338,681 B2
(45) Date of Patent: *May 10, 2016

(54) METHOD FOR REPORTING MINIMIZATION DRIVE TEST MEASUREMENT DATA

(71) Applicant: Industrial Technology Research Institute, Hsinchu County (TW)

(72) Inventor: Jung-Mao Lin, New Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 106 days.

This patent is subject to a terminal disclaimer.

(21) Appl. No.: 13/963,518

(22) Filed: Aug. 9, 2013

(65) Prior Publication Data

US 2014/0044067 A1     Feb. 13, 2014

Related U.S. Application Data

(60) Provisional application No. 61/681,624, filed on Aug. 10, 2012.

(51) Int. Cl.
*H04W 24/10* (2009.01)
*H04W 74/00* (2009.01)
*H04W 72/12* (2009.01)
*H04W 74/08* (2009.01)

(52) U.S. Cl.
CPC ............ *H04W 24/10* (2013.01); *H04W 74/006* (2013.01); *H04W 72/1278* (2013.01); *H04W 74/0833* (2013.01)

(58) Field of Classification Search
None
See application file for complete search history.

(56) References Cited

U.S. PATENT DOCUMENTS

| | | | | |
|---|---|---|---|---|
| 2011/0183662 A1* | 7/2011 | Lee et al. | ............ | 455/422.1 |
| 2012/0040621 A1* | 2/2012 | Jung et al. | ............ | 455/67.11 |
| 2012/0044822 A1* | 2/2012 | Kim et al. | ............ | 370/252 |
| 2012/0064886 A1* | 3/2012 | Kim et al. | ............ | 455/423 |
| 2012/0082051 A1* | 4/2012 | Kim et al. | ............ | 370/252 |

FOREIGN PATENT DOCUMENTS

| | | |
|---|---|---|
| CN | 102342145 A | 2/2012 |
| CN | 102595482 A | 7/2012 |

(Continued)

OTHER PUBLICATIONS

Chinese Office Action of Application No. 201310349624X dated Dec. 28, 2015.

*Primary Examiner* — Gregory Sefcheck
*Assistant Examiner* — Rina Pancholi
(74) *Attorney, Agent, or Firm* — Birch, Stewart, Kolasch & Birch, LLP

(57) ABSTRACT

A method for performing minimization of drive tests measurement data is disclosed. The network assigns a preamble dedicated to the reporting of the logged MDT measurement data, and configures multiple UE to report the logged MDT measurement data by using the paging message. The UEs perform the first random access procedure with the network to obtain the uplink resource and a dedicate indicator for performing the second random access procedure. The UEs perform the second random access procedure for transmitting the request message. The network transmits the response message with a scheduling plan according to the request message(s). The UE transmits the logged MDT measurement data according to the scheduling plan.

20 Claims, 2 Drawing Sheets

(56) References Cited

FOREIGN PATENT DOCUMENTS

| DE | WO 2011101026 A1 * | 8/2011 | ............ H04W 24/10 |
|---|---|---|---|
| EP | 2154927 A1 | 2/2010 | |
| WO | WO 2010/107358 A1 | 9/2010 | |
| WO | WO 2011/093665 A2 | 8/2011 | |
| WO | WO 2011/101026 A1 | 8/2011 | |

* cited by examiner

METHOD FOR REPORTING MINIMIZATION DRIVE TEST MEASUREMENT DATA

CROSS-REFERENCE TO RELATED APPLICATIONS

This application claims the benefit of priority to U.S. Provisional Application Ser. No. 61/681,624, filed on Aug. 10, 2012; the entirety of which is incorporated herein by reference for all purposes.

BACKGROUND

The disclosure generally relates to mobile communications and, more particularly, to a method for reporting minimization of drive tests measurement data in mobile communications.

Nowadays, the mobile communication plays a more and more important role in people's daily life. Therefore, the network operators have invested tremendous times and money to ensure the quality and the reliability of the mobile communications. Conventionally, the network operators send engineers and measurement vehicles to the concerned areas for performing drive tests so as to collect radio measurement data, discover communication problems, etc. Not only do the conventional drive tests require high operation expenditure, but also the accuracy of the measurement data is limited by the complicated radio environment.

In the 3GPP specifications, a solution name "Minimization of Drive Tests (MDT)" is proposed to improve the problem above. The MDT utilizes the user equipments (UEs) to perform the radio measurements. The operation expenditure spent on the drive tests may be reduced and the measurement may be performed on the areas where the users actually utilize mobile communications.

Conventionally, the MDT server in the network may configure a user equipment (UE) to report the immediate MDT measurement data which are collected by the UE in the connected state (e.g., in the RRC connection mode). Besides, the MDT server may configure a UE to report the logged MDT measurement data which are collected by the UE in the idle mode.

In the current scenarios, the MDT server must configure a UE to enter the connection mode for collecting immediate MDT measure data or wait for connected UEs to report the MDT measurement data. Some UEs in the idle mode, however, may already have enough MDT measurement data but do not have a suitable chance to report. Besides, there has not been a solution for configuring multiple UEs to report the logged MDT measurement data. Therefore, the MDT server often cannot obtain the MDT measurement data efficiently.

SUMMARY

In view of the foregoing, it may be appreciated that a substantial need exists for methods and apparatuses that mitigate or reduce the problems above.

An example embodiment of a method for configuring one or more user equipments (UEs) to report logged minimization of drive tests (MDT) measurement data, comprising: transmitting a paging message comprising a reporting indicator for configuring the one or more UEs to report the logged MDT measurement data; receiving one or more first preambles from the one or more UEs which meet one or more reporting constraints; determining a first uplink resource to be granted to a first user equipment (UE); transmitting a first random access response (RAR) to the first UE for indicating the first uplink resource and a dedicate indicator; receiving a second preamble from the first UE at the first uplink resource; transmitting a second RAR to the first UE for signaling a second uplink resource; receiving a request message from the first UE at the second uplink resource; transmitting a response message comprising a scheduling plan to the first UE for indicating a third uplink resource to report the logged MDT measurement data of the first UE; and receiving the logged MDT measurement data of the first UE at the third uplink resource.

Another example embodiment of a method for a user equipments (UE) to report logged minimization of drive tests (MDT) measurement data, comprising: receiving a paging message comprising a reporting indicator for configuring the UE to report the logged MDT measurement data; transmitting a first preambles when one or more reporting constraints are met; receiving a first random access response (RAR) indicating a first uplink resource and a dedicate indicator; transmitting a second preamble at the first uplink resource; receiving a second RAR indicating a second uplink resource; transmitting a request message at the second uplink resource; receiving a response message comprising a scheduling plan indicating a third uplink resource to report the logged MDT measurement data; and transmitting the logged MDT measurement data at the third uplink resource.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
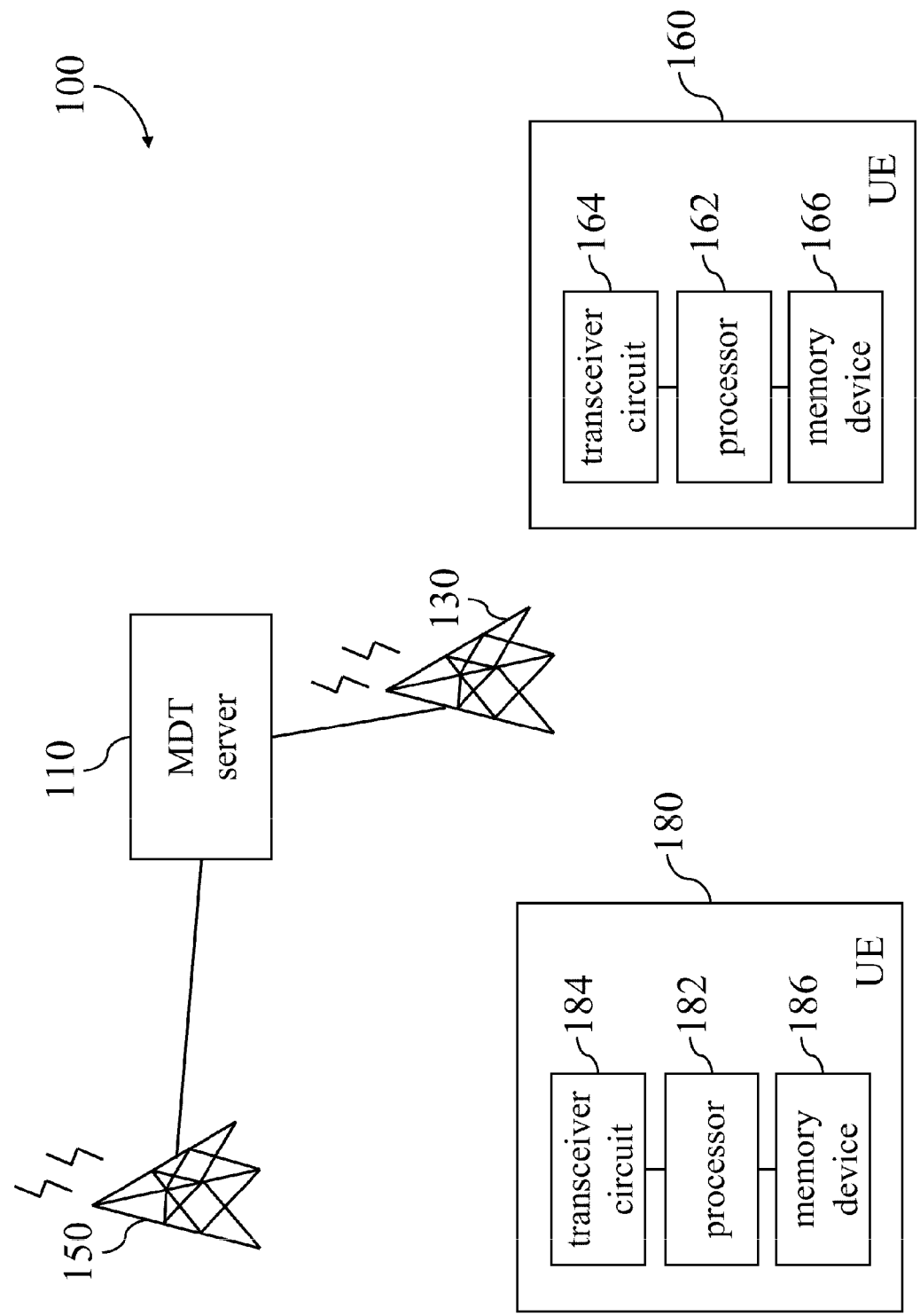
FIG. 1 shows a simplified functional block diagram of a communication system according to one embodiment of the present disclosure.

FIG. 1 shows a simplified functional block diagram of a communication system 100 according to one embodiment of the present disclosure. The communication system 100 comprises an MDT server 110, remote access network (RAN) nodes 130 and 150, and user equipments (UEs) 160 and 180. For the purposes of conciseness and clear explanation, other components and connections are not shown in FIG. 1. For example, there may be multiple MDT servers, more RAN nodes and more UEs in the communication system 100.

The MDT server 110 is configured to perform the minimum of drive tests measurement related operations in the network.

The RAN nodes 130 and 150 is configured to perform radio communications with the UEs 160 and 180, and may be respectively realized with the node B, the evolved node B, the home node B, base transceiver station, etc.

The UEs 160 and 180 respectively comprise processors 162 and 182, transceiver circuits 164 and 184, and memory device 166 and 186. Moreover, the UEs 160 and 180 have the capability of performing MDT measurement. For example, the UEs 160 and 180 may be realized with mobile phones, tablet computers or other suitable mobile devices.

Figure 2:
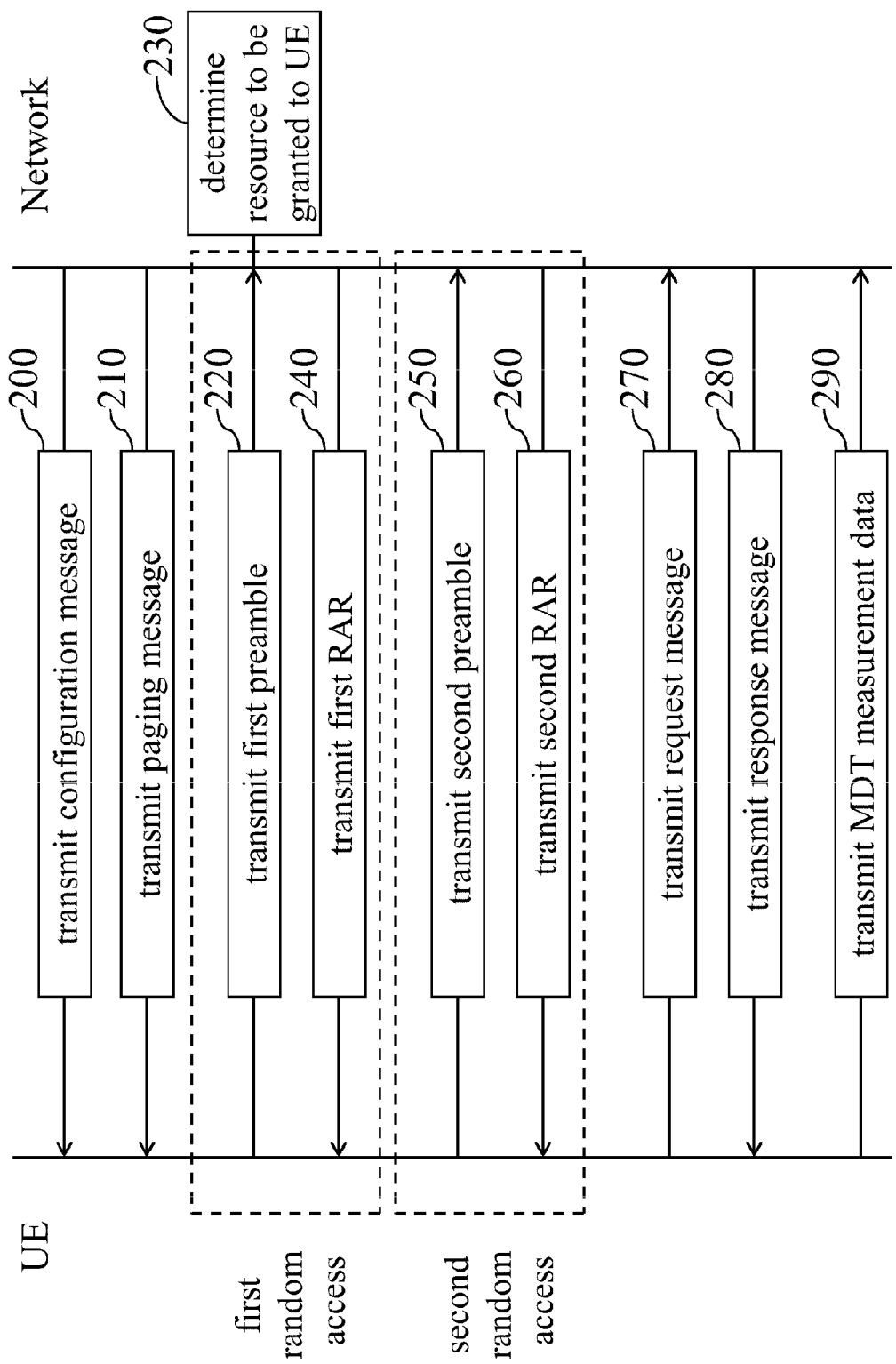
FIG. 2 shows a simplified flowchart of a method for configuring the UEs to report logged MDT measurement data in the communication system in FIG. 1 according to one embodiment of the present disclosure.

FIG. 2 shows a simplified flowchart of a method for configuring the UEs 160 and 180 to report logged MDT measurement data in the communication system 100 in FIG. 1 according to one embodiment of the present disclosure. The operations of the communication system 100 are further explained below with FIGS. 1 and 2. For the purpose of conciseness, the MDT server 110 and the RAN nodes 130 and 150 are collectively shown as "the network" in FIG. 2.

In the operation 200, the network transmits a configuration message to the UEs 160 and 180 for assigning a first preamble dedicated to performing the reporting of the logged MDT measurement data. For example, the first preamble may be chosen from the set of 64 preambles and specifically designated for the use of performing the reporting of the logged MDT measurement data. In one embodiment, the network may utilize the "Logged Measurement Configuration" message for assigning the first preamble to the UEs 160 and 180.

In the operation 210, the network transmits a paging message with a reporting indicator for configuring the UEs 160 and 180 in the idle mode to report the logged MDT measurement data.

Moreover, there may be multiple UEs in the coverage of an RAN node and different UEs may receive the paging messages at different paging cycles. Thus, the paging messages may be sent at different paging cycles for transmitting to more UEs, and the network has a greater chance to collect the logged MDT measurement data from the UEs already having enough logged MDT measurement data.

In one embodiment, the UEs may report the logged MDT measurement data if one or more reporting constraints are met. The reporting constraints may be built in or transmitted to the UEs in advance. For example, the reporting constraints may be transmitted in the configuration message and/or the paging message. The reporting indicator may be transmitted in the paging message to indicate which reporting constraint is applied. For example, the network may transmit a reporting constraint table comprising multiple thresholds of the MDT measurement data size to the UEs. When the reporting indicator indicates the threshold to be applied in the reporting constraint table is 20 KB, the UEs which have an MDT measurement data size greater than 20 KB may report the logged MDT measurement data.

In the operation 220, after the UEs received the paging message, the UE sends the first preamble to the network if the reporting constraint is met. In this embodiment, the UE transmits the first preamble by performing a first random access procedure in the packet random access channel (PRACH).

In the operation 230, the network determines the uplink resources needed to be granted in the second random access procedure for reporting the logged MDT measurement data according to the number of the received first preamble. In one embodiment, the network may calculate the number of the received first preamble(s) according to the random access resources used by the UE(s) to transmit the first preamble(s). In another embodiment, the network may also calculate the number of the received first preamble(s) according to the power ratio of the random access resources. If the network does not receive the first preamble and does not detect any power ratio in the PRACH, it means there is no UE needs to report the logged MDT measurement data and the network does not grant the uplink resource.

In the operation 240, the network transmits a first random access response (RAR) associated with the first preamble to the UE for signaling a first uplink resource and a dedicate indicator. The first uplink resource is utilized by the UE to transmit a second preamble in the second random access. The dedicate indicator is utilized for the UE to receive the second RAR in the second random access process. For example, the network may utilize a dedicated random access radio network temporary identifier (RA-RNTI) which is dedicated to the reporting of the logged MDT measurement data as the dedicate indicator.

In the operation 250, after the UE received the first RAR, the UE randomly selects a preamble to be the second preamble and transmits the second preamble at the first uplink resource indicated in the first RAR. Moreover, the second preamble is configured to be different from the first preamble. If the UE does not receive the first RAR, the UE may abort the procedure of reporting the logged MDT measurement data and stay in the idle mode.

In the operation 260, the network transmits a second RAR to the UEs. The second RAR comprises one or more media access control (MAC) packet data units (PDUs). Each of the MAC PDUs carries one or more second uplink resources for the UE to transmit a request message, and carries one or more corresponding uplink timing references for the UE to perform the uplink synchronization.

In conventional random access procedure, the UE uses a non-dedicated RNTI to find the MAC PDU carrying the second RAR, and the non-dedicated RNTI is associated with the uplink resource which the UE transmits the preamble. In this embodiment, multiple UEs are configured to find the MAC PDU by using the dedicated RA-RNTI which is dedicated to the reporting of the logged MDT measurement data. Because if the UE still uses a non-dedicated RNTI associated with the uplink resource to find the MAC PDU carrying the second RAR, the non-dedicated RNTI may conflict with other RNTIs. Consequently, the contention will occur even if the UEs use different uplink resources.

Moreover, there may be multiple UEs use the same dedicated RA-RNTI to receive the second RAR, and the contention may still occur even if different UEs transmit the second preambles at different uplink resources. To resolve this issue, the network may add a dedicate identification in the second RAR for the MAC PDUs. The dedicate identification is used to differentiate the UEs when the UEs transmit the second preambles at different uplink resources. For example, the dedicate identification may be calculated from the uplink resource which the UE transmits the second preamble. Thus, even if the same preambles are transmitted at different uplink resources by different UEs, the network may still distinguish them and the UEs may find the correct MAC PDU carrying the second RAR.

In the operation 270, the UE finds the MAC PDU carrying the second RAR by using the dedicate identification and the dedicated RA-RNTI which is dedicated to the reporting of the logged MDT measurement data. The UE may therefore transmit a request message at the second uplink resource indicated in the second RAR. Moreover, in order to provide the contention resolution function, the UE may transmit a request message associated with a UE specific identity (e.g., the UE identity) which is uniquely associated with the UE.

In the operation 280, the network receives the request messages and sends a response message to the UE with a scheduling plan. The scheduling plan comprises the third uplink resources granted for the UEs to report the logged MDT measurement data.

Moreover, a contention resolution identity may also be transmitted in the response message to be compared with the UE specific identity. When the contention resolution identity is the same as the UE specific identity, the contention resolution successes. Otherwise, the contention resolution fails and the UE may abort the procedure of reporting the logged MDT measurement data.

In the operation 290, the UE transmits the logged MDT measurement data according to the scheduling plan transmitted in the response message.

After the UE finishes the transmission of the logged MDT measurement data, the UE may clean the memory for storing the MDT measurement data and stay in the idle mode.

In the above embodiments, the network may configure multiple UEs in the coverage of an RAN node to report the logged MDT measurement data. Moreover, by utilizing the reporting indicator in the paging message, the network may feasibly adjust the threshold for reporting the logged MDT measurement data.

In the above embodiments, by utilizing the dedicate identification of the UE, the UE specific identity, the contention resolution identity, etc., a suitable contention resolution mechanism may be provided.

In the drawings, the size and relative sizes of some elements may be exaggerated or simplified for clarity. Accordingly, unless the context clearly specifies, the shape, size, relative size, and relative position of each element in the drawings are illustrated merely for clarity, and not intended to be used to restrict the claim scope.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled with," "couples with," and "coupling with" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A method for configuring a user equipment (UE) in an idle mode to report logged minimization of drive tests (MDT) measurement data, comprising:
   transmitting a paging message comprising a reporting indicator for configuring the UE in the idle mode to report the logged MDT measurement data;
   receiving a first preamble from the UE in the idle mode which meet one or more reporting constraints;
   determining a first uplink resource to be granted to the UE in the idle mode;
   transmitting a first random access response (RAR) to the UE in the idle mode for indicating the first uplink resource and a dedicate indicator;
   receiving a second preamble from the UE in the idle mode at the first uplink resource;
   transmitting a second RAR to the UE in the idle mode for signaling a second uplink resource;
   receiving a request message from the UE in the idle mode at the second uplink resource;
   transmitting a response message comprising a scheduling plan to the UE in the idle mode for indicating a third uplink resource to report the logged MDT measurement data of the UE in the idle mode; and
   receiving the logged MDT measurement data of the UE in the idle mode at the third uplink resource.

2. The method of claim 1, further comprising:
   transmitting a configuration message to the UE for assigning the first preamble dedicated to performing the reporting of the logged MDT measurement data.

3. The method of claim 2, further comprising:
   transmitting the one or more reporting constraints in at least one of the configuration message and the paging message.

4. The method of claim 3, further comprising:
   transmitting the paging message to the UE in the idle mode at one or more paging cycles.

5. The method of claim 1, further comprising:
   determining the first uplink resource to be granted to the UE in the idle mode according to at least one of a number of one or more random access resources used to transmit the first preamble and a power ratio of the one or more random access resources used to transmit the first preamble.

6. The method of claim 1,
   wherein the dedicate indicator is transmitted in the first RAR so that the UE in the idle mode locates a media access control packet data unit carrier in the second RAR according to the dedicate indicator and locates the second uplink resource according to the media access control packet data unit carrier in the second RAR.

7. The method of claim 6, wherein the second RAR comprises a dedicate identification for representing the UE in the idle mode and the dedicate identification is calculated according to the first uplink resource in which the UE in the idle mode transmitting the second preamble.

8. The method of claim 1, wherein the request message comprises a UE specific identity uniquely associated with the UE.

9. The method of claim 8, wherein the response message comprises a contention resolution identity for comparing with the UE specific identity so as to perform a contention resolution.

10. The method of claim 1, wherein the first preamble is dedicated to the reporting of the logged MDT measurement data and is different from the second preamble.

11. A method for a user equipment (UE) in an idle mode to report logged minimization of drive tests (MDT) measurement data, comprising:
   receiving a paging message comprising a reporting indicator for configuring the UE in the idle mode to report the logged MDT measurement data;
   transmitting, in the idle mode, a first preamble when one or more reporting constraints are met;
   receiving, in the idle mode, a first random access response (RAR) indicating a first uplink resource and a dedicate indicator;
   transmitting, in the idle mode, a second preamble at the first uplink resource;
   receiving, in the idle mode, a second RAR indicating a second uplink resource;

transmitting, in the idle mode, a request message at the second uplink resource;

receiving, in the idle mode, a response message comprising a scheduling plan indicating a third uplink resource to report the logged MDT measurement data; and transmitting, in the idle mode, the logged MDT measurement data at the third uplink resource.

12. The method of claim 11, further comprising:

receiving a configuration message for assigning the first preamble dedicated to performing the reporting of the logged MDT measurement data.

13. The method of claim 12, further comprising:

receiving the one or more reporting constraints in at least one of the configuration message and the paging message.

14. The method of claim 11, further comprising:

locating a media access control packet data unit carrier in the second RAR according to the dedicate indicator; and locating the second uplink resource according to the media access control packet data unit carrier in the second RAR.

15. The method of claim 14, further comprising:

receiving a dedicate identification in the second RAR for representing the UE;

wherein the dedicate identification is calculated according to the first uplink resource in which the UE transmitting the second preamble.

16. The method of claim 11, further comprising:

transmitting a UE specific identity uniquely associated with the UE in the request message.

17. The method of claim 16, wherein the response message comprises a contention resolution identity for comparing with the UE specific identity so as to perform a contention resolution.

18. The method of claim 11, wherein the first preamble is dedicated to the reporting of the logged MDT measurement data and is different from the second preamble.

19. The method of claim 11, further comprising:

cleaning a memory for storing the logged MDT measurement data after transmitting the logged MDT measurement data.

20. The method of claim 19, further comprising:

staying in the idle mode after cleaning the memory.

* * * * *